Figure 1:
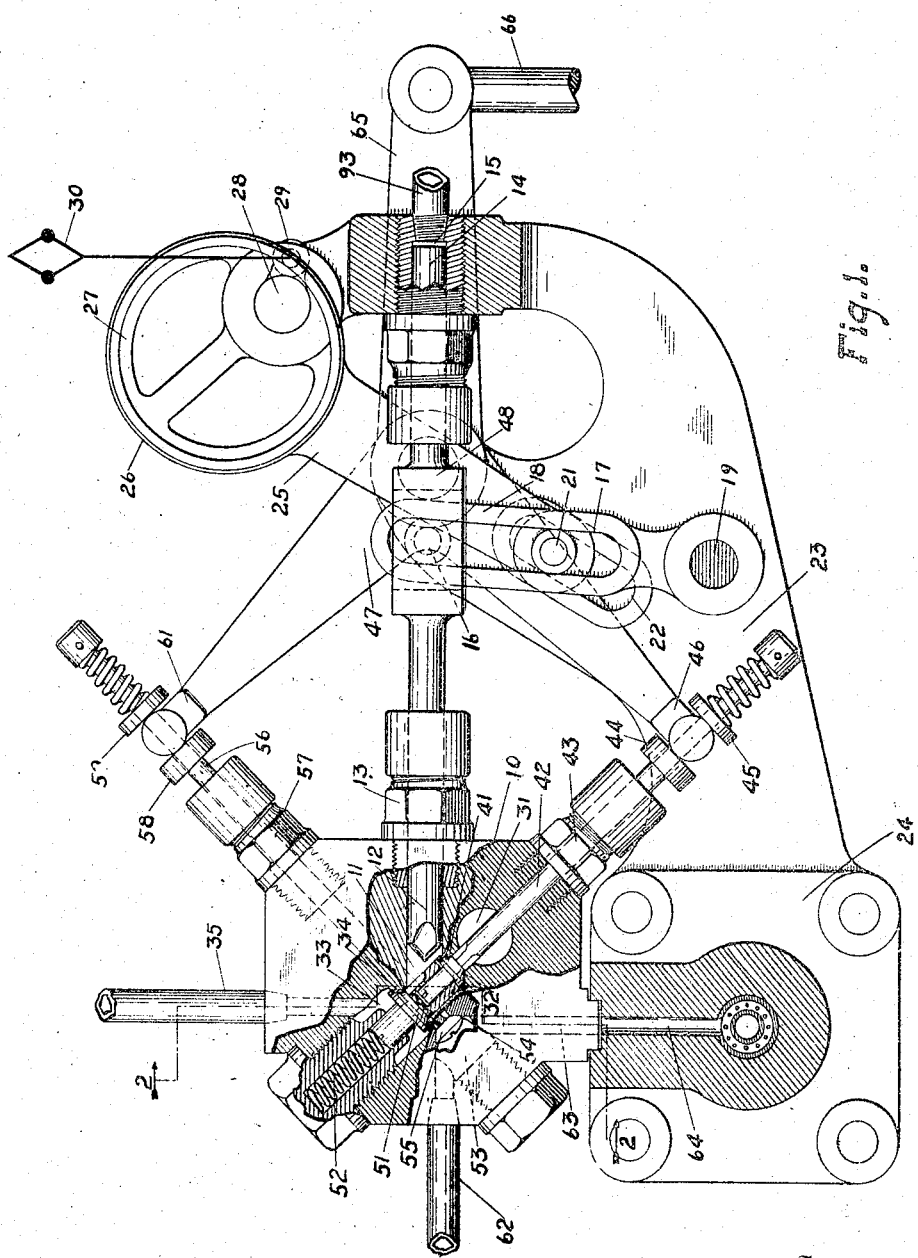

N. McCARTY.
FUEL FEEDER FOR INTERNAL COMBUSTION ENGINES.
APPLICATION FILED FEB. 9, 1909.

933,325.

Patented Sept. 7, 1909.

2 SHEETS—SHEET 1.

Witnesses
Walter Troemel
Thomas W. McMeans

Inventor
Norman McCarty.

By
Bradford Hood
Attorneys

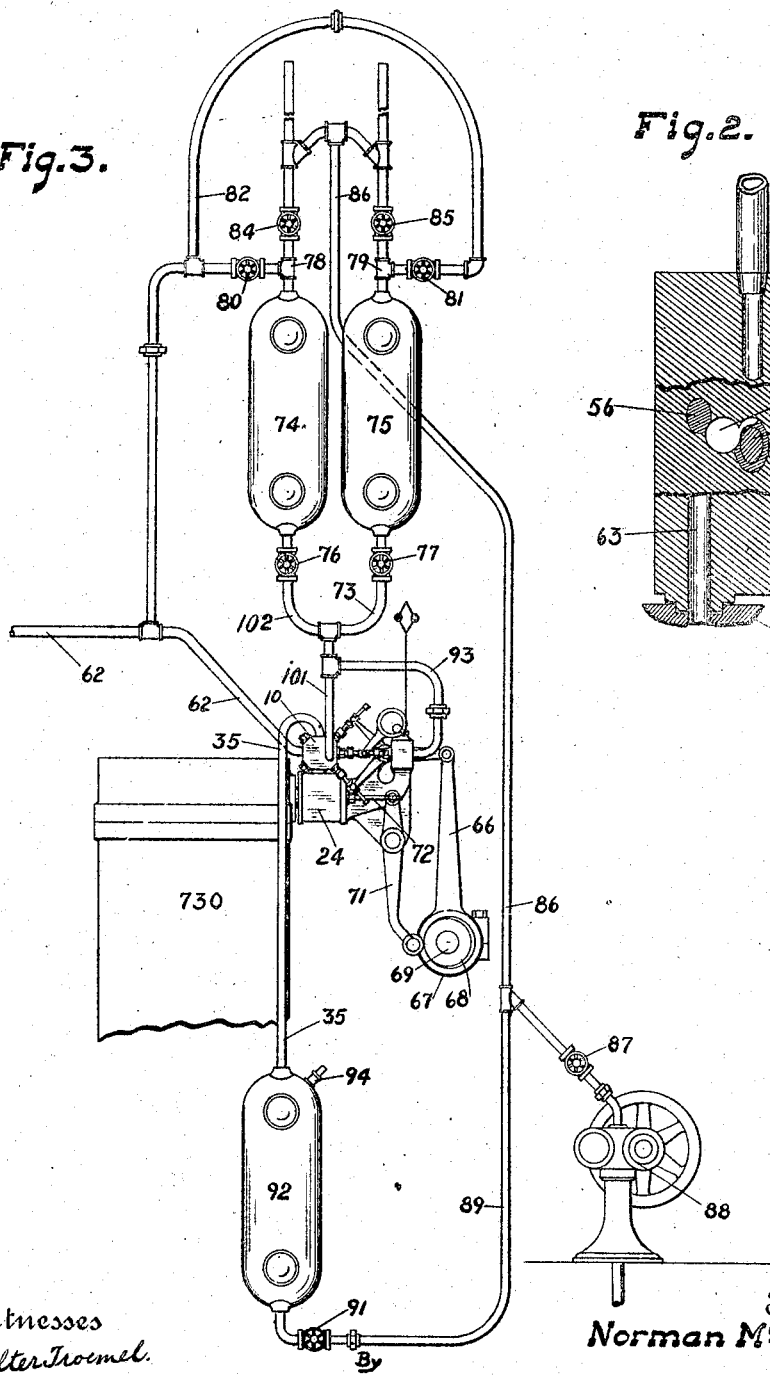
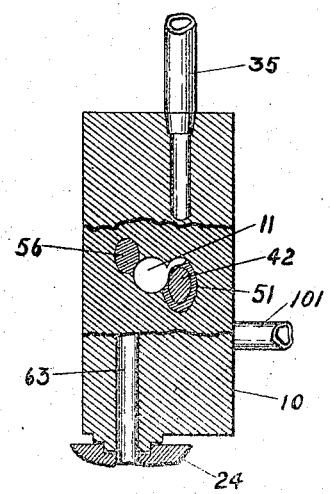

UNITED STATES PATENT OFFICE.

NORMAN McCARTY, OF INDIANAPOLIS, INDIANA, ASSIGNOR TO ATLAS ENGINE WORKS, OF INDIANAPOLIS, INDIANA, A CORPORATION OF INDIANA.

FUEL-FEEDER FOR INTERNAL-COMBUSTION ENGINES.

933,325.                 Specification of Letters Patent.      Patented Sept. 7, 1909.

Application filed February 9, 1909. Serial No. 477,003.

*To all whom it may concern:*

Be it known that I, NORMAN McCARTY, a citizen of the United States, residing at Indianapolis, in the county of Marion and State of Indiana, have invented certain new and useful Improvements in Fuel-Feeders for Internal-Combustion Engines, of which the following is a specification.

In the operation of that type of internal combustion engines wherein the combustion of liquid fuel is slow, as distinguished from an explosion, the liquid fuel is introduced to the combustion chamber at a time when the pressure within the combustion chamber is very high, as much as 500 lbs. per square inch, and it is customary to blow the liquid fuel into the compressed air within the combustion chamber by means of a higher air pressure passing through an atomizer which delivers into the combustion chamber. There is at all times a high pressure within the atomizer and mechanism needs to be provided for introducing into the atomizer measured quantities of liquid fuel the amounts of the successive quantities being determined by speed controlled mechanism connected with the motor. The delivery of fuel to the atomizer under these conditions has, in the past, generally been against the atomizer pressure and therefore required a pumping mechanism capable of delivering fuel against the high pressure of the atomizer. As a consequence an adjustment of the pumping mechanism to deliver differing quantities of fuel was apt to be affected by the high pressures against which delivery had to be made.

The object of my present invention is to produce a measuring and delivering mechanism capable of delivering to the atomizer or other fuel injecting mechanism operating under pressure, without the aid of any forcing member, the mechanism being designed to receive, from a gravity supply, accurately measured successive quantities of liquid and deliver the same by gravity to the atomizer.

The accompanying drawings illustrate my invention.

Figure 1 is a vertical section of the measuring device taken on two parallel planes one of which passes through the axis of one of the valves and the other of which passes through the axis of the measuring plunger; Fig. 2 is a section on the plane of line 2 2 of Fig. 1; Fig. 3 an elevation of the complete fuel-delivery system embodying my invention.

In the drawings 10 indicates a main body within which is formed a measuring chamber 11. Mounted in chamber 11 is a measuring plunger 12 which passes through a suitable packing gland 13 and carries at its outer end a balancing plunger 14 which fits within a balancing chamber 15. Plunger 12 carries a pin 16 which lies within the slot 17 of an operating lever 18 pivoted at 19. Also mounted within slot 17 is a pin 21 which is also mounted within a stationary guide slot 22 lying at an angle to the slot 17, the said guide slot 22 being formed in a bracket 23 carried by the atomizer structure 24 to which the body 10 is secured. Connected to pin 21, so as to shift the same in the slots 17 and 22, is an arm 25 which is carried by an eccentric strap 26 embracing an eccentric 27 carried by a rock shaft 28. Secured to shaft 28 is an arm 29 intended to be connected in any suitable manner to a speed controlled governor 30, the arrangement being such that, by movement of the speed controlled governor, rock shaft 28 will be rocked and pin 21 will be shifted so as to cause a shifting of lever 18 and thus adjust plunger 12 within chamber 11. Formed in body 10 is an inlet chamber 31 which communicates with chamber 11 through a valve seat 32. Communicating with the measuring chamber 11 beyond valve seat 32 is a chamber 33 with a valve seat 34 arranged between said chamber and chamber 11, and leading from chamber 33 is an oil overflow pipe 35. Seated in seat 32 is an oil inlet valve 41 carried by a stem 42 projected out through a suitable packing gland 43 and provided with a fixed collar 44 and a spring pressed collar 45 between which is arranged the end 46 of a lever 47 carried by a rock shaft 48. Sleeved over the inner end of valve 41 is the stem of a valve 51 which is seated in seat 34, being normally held thereto by means of a spring 52. Also formed in body 10 is a discharge chamber 53 which communicates with chamber 11 through a seat 54 in which is seated a valve 55 carried by a stem 56 carried out through a suitable packing gland 57 and provided at its outer end with a fixed collar 58 and a spring pressed collar 59 between which is arranged the end 61 of lever 47. Leading into chamber 53 is an air inlet pipe 62 and leading from chamber 53 is a discharge passage 63 which leads into the receiving passage 64 of atomizer 24. Secured to shaft 48 is an arm 65 which is connected by an arm 66 carried by an eccentric strap 67 mounted upon an eccentric 68, carried by the cam shaft 69 which carries the usual cams for operating the levers 71 which are connected to the needle valve 72 of the atomizer 24, one of said atomizers being provided, in the usual manner, for each power cylinder 730.

The operation of the device thus far described is as follows: Oil flows into chamber 31 under a slight gravity head and a rocking of shaft 48 by a downward pull on arm 65 will open valves 41 and 51 and oil will flow from chamber 31 into chamber 11 so as to fill the same. The amount which will flow into the chamber 11 will depend upon the size of said chamber and the size of said chamber will be accurately determined and adjusted by movement of the plunger 12 which is under direct control of the speed controlled governor, as is clearly apparent. As soon as chamber 11 is filled, shaft 48 is rocked in the opposite direction so that valves 41 and 51 will be seated and thereupon the valve 55 is carried away from its seat so that the oil within chamber 11 will flow into chamber 53 in which is maintained air pressure which is carried to the atomizer, and oil will flow down through passages 63 and 64, to the atomizer 24 and be by it delivered, in the usual manner, to the combustion chamber. The rush of air from pipe 62 through passages 63 and 64 tends to deliver the entire quantity of oil delivered from chamber 11 but there is of course an accumulation of air under pressure in chamber 11 as the oil flows out. On the next operation, valves 41 and 51 are again opened but valve 51, being considerably larger than valve 41 and opening practically at the same instant, the air confined within chamber 11 will pass out past valve 51 into chamber 33 and thence out through the overflow pipe 35 while a fresh charge of oil enters from chamber 31.

It is exceedingly desirable that an apparatus of this kind shall operate under such conditions that there will be very little resistance offered to the shifting of the mechanism controlled by the speed controlled governor and it is for this purpose that I have provided the balancing plunger 14 and cylinder 15 in connection with the arrangement now to be described. Leading into chamber 31 is an oil supply pipe 101 which is connected by pipes 102 and 73 with a pair of identical fuel supply tanks 74 and 75, valves 76 and 77 being inserted between the bottoms of the fuel supply tanks and their outlet pipes. At the upper end tanks 74 and 75 are connected with feed pipes 78 and 79 which are connected through valves 80 and 81 with a pipe 82 which is connected to the pipe 62 which leads from the air compressor (not shown) to chamber 53 of the measuring device 10. Pipes 78 and 79 are also connected through valves 84 and 85 with a supply pipe 86 which is connected through valve 87 with a suitable pump 88 getting its supply from a suitable storage tank, not shown. Pipe 86 is connected by a pipe 89, through valve 91, with the bottom of an overflow tank 92 into the top of which runs the pipe 35, the tank 92 being placed below the measurer 10, while fuel supply tanks 74 and 75 are placed above said measurer a sufficient distance to obtain the desired gravity head for the fuel. Leading from pipe 101 is a pipe 93 which communicates with cylinder 15. A relief 94 is provided at the upper end of tank 92 said valve yielding at, or below, the pressure coming from pipe 62. By this arrangement and assuming tank 74 to be full of fuel and tank 75 to be empty, valves 76, and 80 will be opened and valves 84, 85, 77, 81, 87 and 91 will be closed. Pressure from pipe 62 will thereupon be introduced to the entire system, fuel in tank 74 being under the same pressure that is introduced into the chamber 53, and measuring plunger 12 being subjected at both ends (at the outer end through plunger 14) with the pressure due to the head of fuel plus the air pressure thereon. Consequently the only resistance to actuation of the adjusting devices for plunger 12 will be the friction of the parts and, as this remains constant for either direction of movement of adjustment, the operation of the speed controlled governor upon the measuring plunger will at all times be uniform.

When the fuel within tank 74 is nearly exhausted, valves 91 and 85 will be opened and the pressure which has accumulated within the upper end of the overflow tank 92 will drive whatever fuel there may be in that tank from the overflow tank up into tank 75. The valve 91 will then be closed and tank 75 filled by an operaton of pump 88, valve 87 being opened temporarily for that purpose. Just before the fuel is entirely exhausted from tank 74 valve 85 will be closed and valves 81 and 77 will be opened thus throwing tank 75 into commission whereupon valves 76 and 80 are closed and valve 84 opened and the fuel supply tank 74 may then be filled. By this arrangement there will always be immediately available an adequate supply of fuel for the measuring device and atomizer. It will of course be understood that tanks 74, 75 and 92 may be common to a plurality of measuring devices and atomizers.

I claim as my invention:

1. The combination, with an internal combustion engine, of a fuel feeding mechanism comprising an inlet chamber, a measuring chamber communicating therewith, a valve arranged between the inlet chamber and measuring chamber, an outlet chamber communicating with the measuring chamber and with the combustion chamber of the engine, a valve arranged between the measuring chamber and outlet chamber, means for varying the capacity of the measuring chamber and means for alternately operating said valves.

2. The combination, with an internal combustion engine, of a fuel feeding mechanism comprising an inlet chamber, a measuring chamber communicating therewith, a valve arranged between the inlet chamber and measuring chamber, an outlet chamber communicating with the measuring chamber and with the combustion chamber of the engine, a valve arranged between the measuring chamber and outlet chamber, means for alternately operating said valves and speed-controlled means for automatically varying the receiving capacity of the measuring chamber.

3. The combination, with an internal combustion engine, of a fuel feeding mechanism comprising an inlet chamber, a measuring chamber communicating therewith, a valve arranged between the inlet chamber and measuring chamber, an outlet chamber communicating with the measuring chamber and with the combustion chamber of the engine, a valve arranged between the measuring chamber and outlet chamber, means for alternately operating said valves, a plunger fitted within the measuring chamber and movable therein to vary the receiving capacity of said chamber, and means for shifting the plunger within the measuring chamber to vary the receiving capacity thereof.

4. The combination, with an internal combustion engine, of a fuel feeding mechanism comprising an inlet chamber, a measuring chamber communicating therewith, a valve arranged between the inlet chamber and measuring chamber, an outlet chamber communicating with the measuring chamber and with the combustion chamber of the engine, a valve arranged between the measuring chamber and outlet chamber, means for alternately operating said valves, a plunger fitted within the measuring chamber and movable therewith to vary the receiving capacity of said chamber, and speed controlled means for shifting the plunger within the measuring chamber to vary the receiving capacity thereof.

5. The combination, with an internal combustion engine, of a fuel feeding device comprising an inlet chamber, a measuring chamber communicating therewith, a valve arranged between said inlet chamber and measuring chamber, a discharge chamber communicating with the measuring chamber and the combustion chamber of the engine, a valve arranged between the measuring chamber and discharge chamber, means for alternately operating said valves, a passage leading into the discharge chamber permitting the introduction thereinto of a gas under pressure, and means coöperating with the measuring chamber for varying the receiving capacity thereof.

6. The combination, with an internal combustion engine, of a fuel feeding device comprising an inlet chamber, a measuring chamber communicating therewith, a valve arranged between said inlet chamber and measuring chamber, a discharge chamber communicating with the measuring chamber and the combustion chamber of the engine, a valve arranged between the measuring chamber and discharge chamber, a relief chamber also communicating with the measuring chamber, a valve arranged between said measuring chamber and relief chamber, means for alternately operating said valves, a passage leading into the discharge chamber permitting the introduction thereinto of a gas under pressure, and means coöperating with the measuring chamber for varying the receiving capacity thereof.

7. The combination, with an internal combustion engine, of a fuel feeding device comprising an inlet chamber, a measuring chamber communicating therewith, a valve arranged between said inlet chamber and measuring chamber, a discharge chamber communicating with the measuring chamber and the combustion chamber of the engine, a valve arranged between the measuring chamber and discharge chamber, means for alternately operating said valves, a passage leading into the discharge chamber permitting the introduction thereinto of a gas under pressure, a plunger movably mounted within the measuring chamber to vary the receiving capacity thereof, and means for adjusting said plunger.

8. The combination, with an internal combustion engine, of a fuel feeding device comprising an inlet chamber, a measuring chamber communicating therewith, a valve arranged between said inlet chamber and measuring chamber, a discharge chamber communicating with the measuring chamber and the combustion chamber of the engine, a valve arranged between the measuring chamber and discharge chamber, means for alternately operating said valves, a passage leading into the discharge chamber permitting the introduction thereinto of a gas under pressure, a plunger movably mounted within the measuring chamber to vary the receiving capacity thereof, and speed controlled means for adjusting said plunger.

9. The combination, with an internal combustion engine, of a fuel feeding device comprising an inlet chamber, a measuring chamber communicating therewith, a valve arranged between said inlet chamber and measuring chamber, a discharge chamber communicating with the measuring chamber and the combustion chamber of the engine, a valve arranged between the measuring chamber and discharge chamber, a relief chamber also communicating with the measuring chamber, a valve arranged between said measuring chamber and relief chamber, means for alternately operating said valves, a passage leading into the discharge chamber permitting the introduction thereinto of a gas under pressure, a plunger movably mounted within the measuring chamber to vary the receiving capacity thereof, and means for adjusting said plunger.

10. The combination, with an internal combustion engine, of a fuel feeding device comprising an inlet chamber, a measuring chamber communicating therewith, a valve arranged between said inlet chamber and measuring chamber, a discharge chamber communicating with the measuring chamber and the combustion chamber of the engine, a valve arranged between the measuring chamber and discharge chamber, a relief chamber also communicating with the measuring chamber, a valve arranged between said measuring chamber and relief chamber, means for alternately operating said valves, a passage leading into the discharge chamber permitting the introduction thereinto of a gas under pressure, a plunger movably mounted within the measuring chamber to vary the receiving capacity thereof, and speed controlled means for adjusting said plunger.

11. The combination, with an internal combustion engine, and a fuel injecting means therefor, comprising means for introducing air to the injector under high pressure, of a fuel measuring and delivery device comprising means to receive and variably measure successive portions of fuel independent of the injector pressure, and deliver the same to the injector pressure independent of the fuel supply.

12. The combination, with an internal combustion engine and a fuel injector therefor comprising means for introducing air under high pressure, of a measuring device adapted to deliver successive variably measured quantities of fuel to the injector, a fuel supply tank arranged above said measuring device and delivering thereto, and connections between the pressure air supply and the discharge side of the measuring device and between the pressure air supply and the top of the supply tank.

13. The combination, with an internal combustion engine and a fuel injector therefor comprising means for introducing air under high pressure, of a measuring device adapted to deliver successive measured quantities of fuel to the injector, a fuel supply tank arranged above said measuring device and delivering thereto, and connections between the pressure air supply and the discharge side of the measuring device and between the pressure air supply and the top of the supply tank, an overflow tank, a connection between the top of said overflow tank and the measuring device, a relief valve therefor, a connection between the lower part of the overflow tank and the top of the supply tank, and suitable valves for controlling the flow through various parts of the apparatus.

14. The combination, with an internal combustion engine, an atomizer delivering fuel thereto, and means for delivering air under pressure to and through the atomizer, of a measuring device comprising a measuring chamber, a fuel inlet chamber communicating with the measuring chamber, a valve arranged between the measuring chamber and the fuel inlet chamber, a discharge chamber communicating with the measuring chamber on one side and with the atomizer on the other side, a valve arranged between said discharge chamber and measuring chamber means for alternately actuating said valves, a fuel tank arranged above the measuring device and delivering to the inlet chamber thereof, and a connection between the air pressure supply and the top of said fuel tank.

15. The combination, with an internal combustion engine, an atomizer delivering fuel thereto, and means for delivering air under pressure to and through the atomizer, of a measuring device comprising a measuring chamber, a fuel inlet chamber communicating with the measuring chamber, a valve arranged between the measuring chamber and the fuel inlet chamber, a discharge chamber communicating with the measuring chamber on one side and with the atomizer on the other side, a valve arranged between said discharge chamber and measuring chamber, a relief chamber communicating with the measuring chamber, a valve arranged between said relief chamber and the measuring chamber, means for alternately actuating said valves, a fuel tank arranged above the measuring device and delivering to the inlet chamber thereof, and a connection between the air pressure supply and the top of said fuel tank.

16. The combination, with an internal combustion engine, an atomizer delivering fuel thereto, and means for delivering air under pressure to and through the atomizer, of a measuring device comprising a measuring chamber, a fuel inlet chamber communicating with the measuring chamber, a valve arranged between the measuring chamber and the fuel inlet chamber, a discharge chamber communicating with the measuring chamber on one side and with the atomizer on the other side, a valve arranged between said discharge chamber and measuring chamber, means for alternately actuating said valves, a fuel tank arranged above the measuring device and delivering to the inlet chamber thereof, and a connection between the air pressure supply and the top of said fuel tank, means for varying the receiving capacity of the measuring chamber, a speed controlled governor connected to the engine, and intermediate connections between said speed controlled governor and the means for varying the receiving capacity of the measuring chamber.

17. The combination, with an internal combustion engine, an atomizer delivering fuel thereto, and means for delivering air under pressure to and through the atomizer, of a measuring device comprising a measuring chamber, a fuel inlet chamber communicating with the measuring chamber, a valve arranged between the measuring chamber and the fuel inlet chamber, a discharge chamber communicating with the measuring chamber on one side and with the atomizer on the other side, a valve arranged between said discharge chamber and measuring chamber, a relief chamber communicating with the measuring chamber, a valve arranged between said relief chamber and the measuring chamber, means for alternately actuating said valves, a fuel tank arranged above the measuring device and delivering to the inlet chamber thereof, and a connection between the air pressure supply and the top of said fuel tank, means for varying the receiving capacity of the measuring chamber, a speed controlled governor connected to the engine, and intermediate connections between said speed controlled governor and the means for varying the receiving capacity of the measuring chamber.

18. The combination, with an internal combustion engine, an atomizer delivering fuel thereto, and means for delivering air under pressure to and through the atomizer, of a measuring device comprising a measuring chamber, a fuel inlet chamber communicating with the measuring chamber, a valve arranged between the measuring chamber and the fuel inlet chamber, a discharge chamber communicating with the measuring chamber on one side and with the atomizer on the other side, a valve arranged between said discharge chamber and measuring chamber means for alternately actuating said valves, a fuel tank arranged above the measuring device and delivering to the inlet chamber thereof, and a connection between the air pressure supply and the top of said fuel tank, a measuring plunger movably mounted within the measuring chamber, and means for automatically shifting the measuring plunger to vary the receiving capacity of the measuring chamber.

19. The combination, with an internal combustion engine, an atomizer delivering fuel thereto, and means for delivering air under pressure to and through the atomizer, of a measuring device comprising a measuring chamber, a fuel inlet chamber communicating with the measuring chamber, a valve arranged between the measuring chamber and the fuel inlet chamber, a discharge chamber communicating with the measuring chamber on one side and with the atomizer on the other side, a valve arranged between said discharge chamber and measuring chamber means for alternately actuating said valves, a fuel tank arranged above the measuring device and delivering to the inlet chamber thereof, and a connection between the air pressure supply and the top of said fuel tank, a measuring plunger movably mounted within the measuring chamber, a balancing plunger connected with said measuring plunger, a connection between said balancing plunger and the fuel supply whereby a balancing pressure is maintained upon the measuring plunger and means for automatically shifting the measuring plunger to vary the receiving capacity of the measuring chamber.

20. The combination, with an internal combustion engine, an atomizer delivering fuel thereto, and means for delivering air under pressure to and through the atomizer, of a measuring device comprising a measuring chamber, a fuel inlet chamber communicating with the measuring chamber, a valve arranged between the measuring chamber and the fuel inlet chamber, a discharge chamber communicating with the measuring chamber on one side and with the atomizer on the other side, a valve arranged between said discharge chamber and measuring chamber, a relief chamber communicating with the measuring chamber, a valve arranged between said relief chamber and the measuring chamber, means for alternately actuating said valves, a fuel tank arranged above the measuring device and delivering to the inlet chamber thereof, and a connection between the air pressure supply and the top of said fuel tank, a measuring plunger movably mounted within the measuring chamber, and means for automatically shifting the measuring plunger to vary the receiving capacity of the measuring chamber.

21. The combination, with an internal combustion engine, an atomizer delivering fuel thereto, and means for delivering air under pressure to and through the atomizer, of a measuring device comprising a measuring chamber, a fuel inlet chamber communicating with the measuring chamber, a valve arranged between the measuring chamber and the fuel inlet chamber, a discharge chamber communicating with the measuring chamber on one side and with the atomizer on the other side, a valve arranged between said discharge chamber and measuring chamber, a relief chamber communicating with the measuring chamber, a valve arranged between said relief chamber and the measuring chamber, means for alternately actuating said valves, a fuel tank arranged above the measuring device and delivering to the inlet chamber thereof, and a connection between the air pressure supply and the top of said fuel tank, a measuring plunger movably mounted within the measuring chamber, a balancing plunger connected with said measuring plunger, a connection between said balancing plunger and the fuel supply whereby a balancing pressure is maintained upon the measuring plunger and means for automatically shifting the measuring plunger to vary the receiving capacity of the measuring chamber.

In witness whereof, I, have hereunto set my hand and seal at Indianapolis, Indiana, this twenty-ninth day of January, A. D. one thousand nine hundred and nine.

NORMAN McCARTY. [L. S.]

Witnesses:
 ARTHUR M. HOOD,
 THOMAS W. McMEANS.